United States Patent Office 3,728,275
Patented Apr. 17, 1973

3,728,275
PREPARATIONS CONTAINING CONCENTRATED AQUEOUS ASYMMETRICALLY SUBSTITUTED BIS-TRIAZINYLAMINOSTILBENES AND THE USE OF THE PREPARATIONS FOR OPTICAL BRIGHTENING
Paul Horlacher, Mohlin, Aargau, and Gerhard Creutzburg, Riehen, Switzerland, assignors to Ciba-Geigy Corporation, Ardsley, N.Y.
No Drawing. Filed Oct. 13, 1970, Ser. No. 80,485
Int. Cl. D06l 3/12
U.S. Cl. 252—301.2 W    5 Claims

ABSTRACT OF THE DISCLOSURE

Mixtures of new asymmetrically substituted bis-triazinylaminostilbenes are optical brighteners for organic materials. The mixtures are prepared by reacting cyanuric chloride with an aminobenzenesulfonic acid, 4,4'-diaminostilbene-2,2'-disulfonic acid and a mixture of an isomer mixture of dimethylmorpholines and diethanolamine.

---

DESCRIPTION OF THE INVENTION

The invention relates to concentrated aqueous brightener preparations containing a mixture of new asymmetrically substituted bis-triazinylaminostilbenes, and to the use of these preparations for the optical brightening of high-molecular organic materials, as well as to the material brightened by means of these preparations.

The optical brightening of cellulose- and polyamide-containing substrates with bis-s-triazinylaminostilbene-2,2'-disulphonic acids is known. In order to satisfy as far as possible all the conditions existing with regard to application of the optical brighteners, the triazine rings have been substituted with the most diverse chemical groups. Some known optical brighteners of this series have the disadvantage of being unfavorably affected in media having low pH-values, e.g. even of 4–5, such as are frequently necessary in the paper-manufacturing industry: These optical brighteners not only are unable to develop their full fluorescence under acid conditions, but form in most cases in the acid aqueous solution precipitates which prevent an effective application of the optical brighteners. In general, the stability in storage of concentrated brightener solutions, which are sought after on account of their convenience in handling, and frequently preferred to the preparations in powder form, constitutes a problem which has hitherto not been satisfactory solved. Surprisingly, the preparations according to the invention, of which the stability in storage and resistance to cold are excellent, are now able to overcome the stated difficulties.

The preparations according to the invention are suitable for the optical brightening of, in particular, textile material made from cellulose, natural or synthetic polyamide fibres, and especially for the optical brightening of paper. The preparations can be either added to the paper pulp or applied to the surface of the paper. In the latter case, they form a constituent of a brushing liquor. Furthermore, they may be added to suitable textile treatment liquors such as finishing liquors, and cleansing agents which can be used, e.g. for the washing of household linen.

Suitable finishing liquors are those which contain precondensates of reactant resins such as cyclic N-methylolureas, as well as metal salt catalysts such as magnesium chloride, and which are used for the crease-proof finishing of cotton after the dry cross-linking process.

The triazinylaminostilbene compounds contained in the preparations according to the invention are alkali salts or ammonium salts of acids corresponding to Formula I:

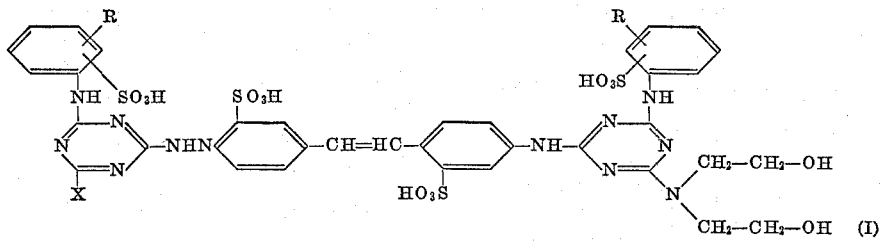

whereby the non-located SO₃H-groups are in m- or p-position to —NH—.

The symbols in the formula have the following meanings:

R represents hydrogen or an alkyl group having 1 to 4 carbon atoms, and
X represents the 2,5-, 2,3- and 3,5-dimethylmorpholinyl groups.

Alkali metal cations or ammonium cations are preferably sodium or diethanolammonium or triethanolammonium.

The concentration of the preparations according to the invention of compounds of Formula I is, in general, 10 to 40%, especially 15 to 25%. Even the preparations with maximum concentrations are infinitely stable both at 0° C. and at normal room temperatures, and do not crystallise out at these temperatures.

Depending on the purpose for which they are being used, the preparations according to the invention can be worked directly into detergents, cleansing agents, softeners, or into other textile auxiliaries, or they may be diluted with water to obtain 0.001 to 1 percent solutions. The brighteners are incorporated into the material in amounts of 0.05 to 5 percent by weight, preferably 0.1 to 2 percent by weight, calculated on the weight of the material to be brightened. Cellulose textiles can be brightened from a long bath or on the pad-dyeing machine, together with synthetic resins, detergents or softeners, with the compounds contained in the preparations. Nylon can be brightened from an acid bath at 90 to 100° C. Of particular value is the application of the new preparations in the paper industry. The preparations may be used in the pulp and on the surface of the paper, i.e. they can be added to the paper pulp at low pH-values in the beater, or applied on to the already formed paper, e.g. in binder preparations in surface sizing, or in pigment/binder brushing liquors. Brightening of paper using the surface-brushing process may be carried out also without any other finishing agents. In this case, the base paper is treated at room temperature with a 0.05 to 1 percent aqueous brightener solution, and then dried as usual.

The compounds contained in the preparations according to the invention can be produced by reacting 2 moles of cyanuric chloride with 2 moles of sulphanilic acid, metanilic acid, alkylsulphanilic acid or alkylmetanilic acid in aqueous medium and in the presence of acid-binding agents such as alkali carbonates, alkali bicarbonates, alkali hydroxides or alkali acetates, at a temperature of under 10° C.; then with one mole of 4,4'-diaminostilbene-2,2'-disulphonic acid, likewise in the presence of acid-binding agents, at a temperature of between 0 and 30° C.; and finally with a mixture of diethanolamine and an isomer mixture of 2,5-, 2,3- and 3,5-dimorpholine, whereby identical molar amounts, preferably 2.2 moles in each case, of diethanolamine and of the isomer mixture are used, at elevated temperature, e.g. at 50 to 100° C. The reaction may be performed either in a purely aqueous medium, or also in a mixture of water and hydrophilic organic solvents, such as acetone or methyl ethyl ketone.

It is also possible, however, to react in a first stage 1 mole of 4,4'-diaminostilbene-2,2'-disulphonic acid with 2 moles of cyanuric chloride; and to then react the formed primary product firstly with 2 moles of aminosulphonic acid and then with dialkanolamine and dimethylmorpholine.

According to another process for the production of compounds of Formula I, 1 mole of cyanuric acid chloride is reacted with 1 mole of sulphanilic, metanilic or of an alkyl-substituted compound thereof; and the thus formed product then reacted with 1 mole of aminonitrostilbene-2,2'-disulphonic acid. 1 mole of the thus obtained intermediate product is reacted with diethanolamine to give an intermediate product, of which the nitro group is reduced to the amino group, whereupon the amino compound is condensed with a compound obtained by reaction of 1 mole of cyanuric acid chloride with 1 mole of sulphanilic, metanilic, alkylsulphanilic or alkylmetanilic acid. The thus formed intermediate product is finally further reacted with a mixture of 2,5-, 2,3- and 3,5-dimethylmorpholine.

Preferred compounds of Formula I are such compounds in which R represents hydrogen.

The temperature is given in degrees centigrade in the following examples.

Example 1

To a suspension cooled to 0° of 100 g. (0.542 mole) of cyanuric chloride in 700 ml. of water are added, with stirring, 93.8 g. (0.542 mole) of 4-aminobenzene-1-sulphonic acid. Sodium carbonate, as a 15% aqueous solution, is added in the course of 2 to 3 hours in such a way that the pH-value is maintained between 1 and 2 with a reaction temperature of 0 to 5°. No further 4-aminobenzene-1-sulphonic acid can be detected after about 3 hours. Commencing at a temperature of 6°, 95 g. (0.257 mole) of the disodium salt of 4,4'-diaminostilbene-2,2'-disulphonic acid are then added as a ca. 10% solution. The pH-value is held at a value of 6–7 by the addition of 15% sodium carbonate solution. The addition of the solution of the disodium salt of 4,4'-diaminostilbene-2,2'-disul- phonic acid is finished after one hour, and the reaction temperature has risen to 20–25°. The mixture is then heated at a pH-value of 6.5–7 to 90–95°, whereby the result of the test for 4,4'-diaminostilbene-2,2'-disulphonic acid is negative. An amount of 100 g. of sodium chloride is added, the whole allowed to cool, whilst being stirred, to ca. 30°, and the almost colourless crystal mass separated.

Into a stirrer vessel are placed 62.7 g. (0.545 mole) of an isomer mixture consisting of about 56 percent by weight of 2,5-, 36 percent by weight of 3,5- and 8 percent by weight of 2,3-dimethylmorpholine, and 57.3 g. (0.545 mole) of diethanolamine. The crystal mass, filtered off by suction and containing about 50 percent by weight of water, is added at 20 to 25°, with stirring, to the mixture, and this diluted with water to obtain a total weight of 900 g. The mixture is subsequently heated to 90 to 95°, and is maintained for one hour at this temperature. The initially colourless suspension thereby slowly changes into a light-yellow to yellow-brown, clear, fluorescent solution.

After the solution has cooled to 50°, 150 g. of ethylene glycol ethyl ether are added and, to make up the amine content, 58 g. of diethanolamine. The brightener concentration is adjusted to 25% by the addition of ca. 40 ml. of water. The solution is afterwards filtered to remove the small amount of undissolved substance.

The obtained solution can be stored for an indefinite period of 0° or at room temperature, without crystallisation occurring. It is suitable for the optical brightening of cellulose and polyamide textiles, as well as for the optical brightening of paper.

The compound prepared as described in the first two paragraphs of the example can be finished as follows:

The thus obtained solution, which is fluorescent and light-yellow to brown in colour, is slowly added at a temperature of 55–60°, with stirring, to another solution consisting of 50 g. of ammonium chloride in 1000 g. of 20% aqueous hydrochloric acid. A yellow suspension is obtained, and this is stirred until an easily filterable precipitation has formed. The thus prepared sulphonic acid is then collected on an acid-resistant filter, and pressed. A solution consisting of 300 g. of ethylene glycol monoethyl ether, 40 g. of aqueous 25% ammonia, 60 g. of diethanolamine and 40 g. of triethanolamine is prepared in a 2 litre flask provided with a mechanical stirrer. While stirring is maintained, the yellow filter cake is added portionwise to this solution. The temperature is raised to 80–90° and stirring continues until a clear solution is obtained. Distilled water is added to give 1500 g. of solution, and this is then allowed to cool. In this manner is obtained an optical brightener solution containing about 18% of active substance relative to the tetrasulphonic acid.

Examples 2 to 7

The same procedure is used as that described in Example 1, whereby the 4-aminobenzene-1-sulphonic acid is replaced, however, by equivalent amounts of the following sulphonic acid mixtures;

Example 2

60 mol percent of 4-aminobenzene-1-sulphonic acid and 40 mol percent of 3-aminobenzene-1-sulphonic acid;

Example 3

60 mol percent of 4-aminobenzene-1-sulphonic acid, 35 mol percent of 3-aminobenzene-1-sulphonic acid and 5 mol percent of 2-methylaniline-4-sulphonic acid;

Example 4

60 mol percent of 4-aminobenzene-1-sulphonic acid, 30 mol percent of 3-aminobenzene-1-sulphonic acid and 10 mol percent of 2-methylaniline-4-sulphonic acid;

Example 5

60 mol percent of 4-aminobenzene-1-sulphonic acid, 20 mol percent of 3-aminobenzene-1-sulphonic acid and 20 mol percent of 2-methylaniline-4-sulphonic acid;

Example 6

60 mol percent of 4-aminobenzene-1-sulphonic acid, 10 mol percent of 3-aminobenzene-1-sulphonic acid and 30 mol percent of 2-methylaniline-4-sulphonic acid;

Example 7

60 mol percent of 4-aminobenzene-1-sulphonic acid and 40 mol percent of 2-methylaniline-4-sulphonic acid.

Example 8

An amount of 4 mg. of the preparation according to Example 1 is added to a solution of 0.2 g. of sodium sulphate in 100 ml. of water. This aqueous solution containing the brightener is heated to 40–45°; 3 g. of preliminarily bleached cotton fabric are then introduced into the solution and treated for 30 minutes at this temperature. The fabric is afterwards rinsed for 2 minutes with cold running water, and dried for 20 minutes at 60°.

The thus treated fabric is brightened brilliantly white.

Example 9

An amount of 4 mg. of the preparation according to Example 1 is added to a solution of 0.2 g. of sodium sulphate and 0.2 ml. 40% acetic acid in 100 ml. of water. This aqueous solution containing the brightener is heated to 40–45°; 3 g. of preliminarily bleached cotton fabric are then introduced into the solution and treated for 30 minutes at this temperature. The fabric is afterwards rinsed for 2 minutes with cold running water, and dried for 20 minutes at 60°.

The thus treated fabric has a brilliantly white appearance.

Example 10

An amount of 4 mg. of the preparation according to Example 1 is added to a solution of 0.2 g. of sodium sulphate and 0.2 g. of aluminium sulphate in 100 ml. of water. This aqueous solution containing the brightener is heated to 40–45°; 2 g. of preliminarily bleached cotton fabric are then introduced into the solution and treated for 30 minutes at this temperature. The fabric is afterwards rinsed for 2 minutes with cold running water, and the dried for 20 minutes at 60°.

The thus treated fabric is brightened brilliantly white.

Example 11

A fibre slurry is produced as follows: 50 g. of an aqueous suspension of 5 g., relative to the dry weight, of bleached sulphite cellulose are mixed with 98.5 ml. of tap water and 1.5 ml. of 10% aqueous aluminium sulphate solution. This corresponds aproximately to a return water containing acid, as is used industrially. The mixture, which has a pH-value of 4.5, is vigorously stirred for about 5 minutes at room temperature. To the mixture are then added 7.5 ml. of a 10% alumina suspension as white pigment, whereupon stirring proceeds for a further 5 minutes.

To this fibre slurry are then added 0.025 g. of a preparation according to Example 1, and the whole is well mixed for 15 minutes. Into the obtained mixture are then stirred 1.5 ml. of a 5% aqueous colophony suspension having a dry content of about 41% resin (85% free resin and 15% saponified resin) and 1% of maleic acid diethyl ester, corresponding to 1.5% of colophony calculated on the dry weight of the fibre. After 5 minutes stirring, 1.5 ml. of a 10% aqueous aluminium sulphate solution are added to the pulp. Stirring is continued for a further 5 minutes, whereupon the fibre slurry, which now has a pH-value of about 4.3, is diluted with tap water to 100 ml. This pulp is processed to obtain sheets, and these are then pressed and dried.

The paper has a pure white, brilliant appearance.

Example 12

A brushing liquor is produced as follows: To 650 ml. of cold water free from salt are added 75 g. of decomposed starch, and the mixture is heated to 90°, whereupon, after 15 minutes stirring, a colloidal solution is obtained; to this are then added 500 g. of alumina, 2 g. of a mixture of sodium poly- and metaphosphate as dispersing agent, 0.2 g. of a sulphated dodecyl alcohol polyglycol ether having 10–20 ethylene oxide groups, as wetting agent, and 75 g. of a styrene-butadiene-copolymer latex. After the pH-value of the liquor has been adjusted with ammonia to 8–9, 10 g. of the preparation according to Example 1 are added per litre of liquor.

Paper sheets made from sulphite celulose bleached with hydrogen peroxide are impregnated, in a paper-coating apparatus of W. A. Bachofen, Basle (system J. R. Geigy A.G.) with the above brushing liquor in such a way that 17 g. of the liquor are applied to 1 square metre of paper. The dried sheets are brightened brilliantly white.

The decomposed starch used is starch which has been treated with α-amylase, with heating up to the gelling point (about 70°) and until a viscosity of approximately 32 centipoise (measured on a 10% solution of decomposed starch in a Höppler-falling-ball viscosimeter) is obtained.

The styrene-butadiene copolymer latex contains 48% of solid constituents, and has a specific weight of 1.003 at 25°, a pH-value of 9.5 and a viscosity of 40 centipoises (determined according to Brookfield at 50 revolutions per minute); the solid constituents have a specific weight of 1.008.

Example 13

A finishing liquor is produced containing per litre 8 g. of the preparation produced according to Example 1, 52 g. of dimethylolethyleneurea, 23 g. of hexamethylolmelamine and 18 g. of crystallised magnesium chloride. A cotton fabric is padded at 20° with this liquor; the fabric is squeezed out to 60–70% relative to the dry weight of the fabric, and dried at 60°. The fabric is thereupon condensed for 5 minutes to 140°.

In this manner is obtained a beautifully white brightened fabric.

What we claim is:

1. An aqueous concentrated brightener preparation containing 10 to 40% by weight of an alkali salt, diethanolammonium salt or triethanolammonium salt of a mixture of compounds of Formula I:

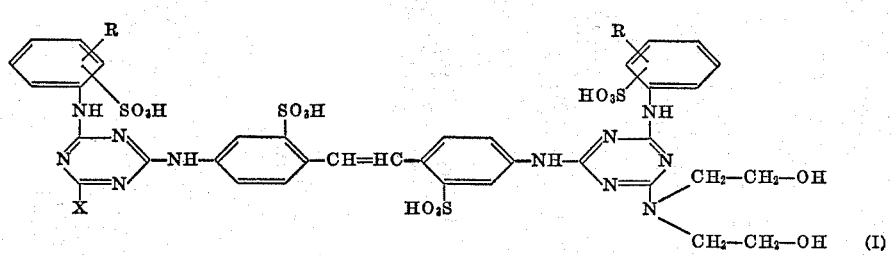

wherein the non-located SO$_3$H-groups are in m- or p-position to —NH—,

R represents hydrogen or an alkyl group having 1 to 4 carbon atoms, and

X represents the 2,5-, 2,3- and 3,5-dimethylmorpholinyl groups, said preparation containing an isomer mixture of the 2,5-, 2,3-, and 3,5-dimethylmorpholinyl groups.

2. Preparation according to claim 1 comprising a mixture of compounds of Formula I wherein R represents hydrogen.

3. Preparations according to claim 2 comprising a mixture of compounds of the formula:

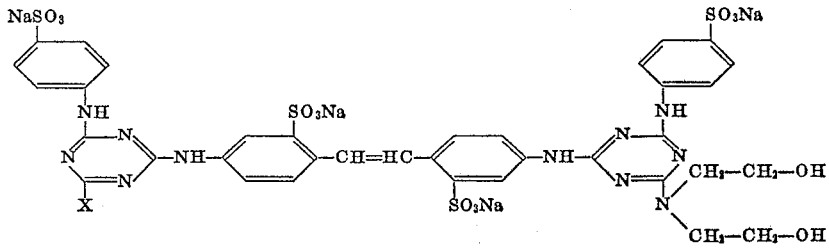

wherein X is the 2,5-, 2,3- or 3,5-dimethylmorpholinyl group.

4. A composition containing textile material made from cellulose or polyamides and a brightener preparation containing an alkali salt, diethanolammonium salt or triethanolammonium salt of a mixture of compounds of Formula I:

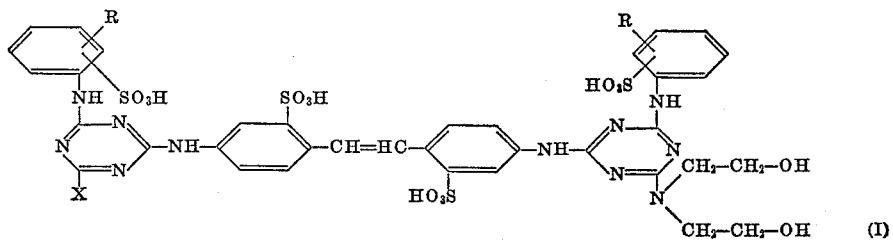

wherein the non-located SO$_3$H-groups are in m- or p-position to —NH—,

R represents hydrogen or an alkyl group having 1 to 4 carbon atoms, and

X represents the 2,5-, 2,3- and 3,5-dimethylmorpholinyl groups, said preparation containing an isomer mixture of the 2,5-, 2,3-, and 3,5-dimethylmorpholinyl groups.

5. A composition containing paper and a brightener preparation containing an alkali salt, diethanolammonium salt or triethanolammonium salt of a mixture of compounds of Formula I:

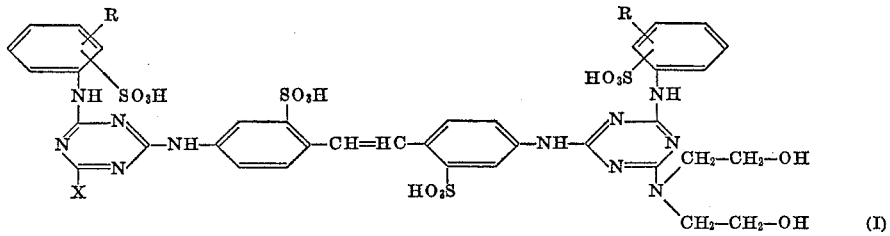

wherein the non-located SO$_3$H-groups are in m- or p-position to —NH—,

R represents hydrogen or an alkyl group having 1 to 4 carbon atoms, and

X represents the 2,5-, 2,3- and 3,5-dimethylmorpholinyl groups, said preparation containing an isomer mixture of the 2,5-, 2,3-, and 3,5-dimethylmorpholinyl groups.

References Cited

UNITED STATES PATENTS

| | | | |
|---|---|---|---|
| 3,177,207 | 4/1965 | Siegel et al. | 260—240 |
| 3,459,743 | 5/1969 | Zussman et al. | 260—240 |
| 3,479,349 | 11/1969 | Allison et al. | 260—240 |
| 3,589,921 | 6/1971 | Allison et al. | 106—137 |
| 3,406,118 | 10/1968 | Tscharner et al. | 252—301.2 W |

PATRICK P. GARVIN, Primary Examiner

A. P. DEMERS, Assistant Examiner

U.S. Cl. X.R.

117—33.5 T; 260—240 B